(12) United States Patent
Hirata (10) Patent No.: US 7,215,478 B1
(45) Date of Patent: May 8, 2007

(54) IMMERSION OBJECTIVE OPTICAL SYSTEM

(75) Inventor: Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/367,403

(22) Filed: Mar. 6, 2006

(51) Int. Cl.
G02B 21/02 (2006.01)

(52) U.S. Cl. .......................... 359/656; 359/658; 359/769

(58) Field of Classification Search ........ 359/656–661, 359/754, 769
See application file for complete search history.

(56) References Cited

U.S. PATENT DOCUMENTS 5,659,425 A * 8/1997 Suzuki ....................... 359/658
2004/0051957 A1 3/2004 Liang

\* cited by examiner

Primary Examiner—Scott J. Sugarman
(74) Attorney, Agent, or Firm—Pillsbury Winthrop Shaw Pittman LLP (57) ABSTRACT

An objective optical system whose outer diameter is reduced, whose overall length is increased, in which chromatic aberrations are well corrected, and which is suitable for in-vivo examination with a high numerical aperture is realized. There is provided an immersion objective optical system comprising, in order from an object side: a first group having positive power; a second group having positive power; a third group having negative power; a fourth group having positive power; and a fifth group having positive power, wherein the first group includes a plano-convex lens L1 whose convex surface faces an image-plane side, and a surface at the extreme object side is a substantially flat surface; the second group includes a lens L2 in which a surface at the extreme object side of the second group is a convex surface facing the object side and a lens L3 in which a surface at the extreme image-plane side of the second group is a concave surface facing the image-plane side; the third group includes a compound lens in which a biconvex lens L4 and a biconcave lens L5, from the object side, are joined; the fourth group includes a positive lens L6 whose convex surface faces the object side; and the fifth group includes at least one compound lens.

20 Claims, 7 Drawing Sheets

IMMERSION OBJECTIVE OPTICAL SYSTEM

BACKGROUND OF THE INVENTION

1. Field of the Invention

The present invention relates to high-numerical-aperture objective optical systems having a long, thin shape, and more particularly, relates to an immersion objective optical system suitable for insertion into an animal such as a mammal to carry out in vivo examination.

This application is based on Japanese Patent Application No. 2004-306154, the content of which is incorporated herein by reference.

2. Description of Related Art

In the related art, a dye or fluorescent marker is attached to specific molecules, tissue, cells, and so on and fluorescence microscopes, confocal laser-scanning microscopes, and the like are used to examine the behavior of the molecules in the cells and tissue of living organisms.

The behavior of molecules in a live individual mammalian organism, such as a mouse, may differ from that in cultured cells. Therefore, examination of biological tissue and the interior of cells is carried out while the individual organism is alive (in-vivo).

When examining the interior of a living organism, because the outer diameter of the objective lens in conventional microscopes is large, it is necessary to make a large incision in the living organism to carry out examination. Making a large incision in a living organism, however, is highly invasive, and therefore long-term examination is impossible.

In general, because endoscopes have small outer diameters, invasiveness to a living organism is low; however, because the magnification is low, it is insufficient for carrying out examination of the behavior of molecules inside biological tissue and cells.

A magnifying endoscope has high magnification, but because the numerical aperture (NA) at the object side is low, the resolution and brightness are insufficient.

On the other hand, objective optical systems having large numerical aperture, reduced outer diameter, and comparatively long overall length have also been disclosed (for example, see United States Patent Application No. 2004/0051957). With the objective optical system disclosed in this patent document 1, by making a small hole in a living organism and inserting the optical system through this hole, it is possible to examine the interior of the living organism with minimal invasiveness.

However, the objective optical system described in United States Patent Application No. 2004/0051957 does not sufficiently correct chromatic aberrations, and therefore, when carrying out white-light observation or fluorescence observation, the wavelengths of excitation light and fluorescence produced in the specimen differ, which results in the problem of low resolution.

In particular, in the case of fluorescence observation using a confocal optical system, not correcting the chromatic aberrations results in the problem of reduced brightness of the detected fluorescence.

BRIEF SUMMARY OF THE INVENTION

The present invention has been conceived in light of the circumstances described above, and an object thereof is to realize an immersion objective optical system with reduced outer diameter and increased overall length, in which chromatic aberrations are well-corrected, and which is suitable for in vivo examination with a large numerical aperture.

In order to realize the object described above, the present invention provides the following solutions.

The present invention provides an immersion objective optical system comprising, in order from an object side, a first group having positive power; a second group having positive power; a third group having negative power; a fourth group having positive power; and a fifth group having positive power, wherein the first group includes a planoconvex lens L1 whose convex surface faces an image-plane side, and a surface at the extreme object side is a substantially flat surface; the second group includes a lens L2 in which a surface at the extreme object side of the second group is a convex surface facing the object side and a lens L3 in which a surface at the extreme image-plane side of the second group is a concave surface facing the image-plane side; the third group includes a compound lens in which a biconvex lens L4 and a biconcave lens L5, from the object side, are joined; the fourth group includes a positive lens L6 whose convex surface faces the object side; and the fifth group includes at least one compound lens.

According to the present invention, by making the extreme object side in the first group having positive power be a substantially flat surface, it is possible to ensure that no air bubbles get in between. Also, by including the planoconvex lens L1 with its convex surface facing the image-plane side, it is possible to reduce the spherical aberration and comatic aberration produced.

In the second group having positive power, because the surface at the extreme object side in the second group is the lens L2 with its convex surface facing the object side, the spherical aberration and comatic aberration produced by this surface are large; instead, however, it is possible to reduce the divergence of the beam and to prevent the ray height from increasing at the image-plane side of the second group. As a result, it is possible to reduce the outer diameter of the lenses.

Because the surface at the extreme image-plane side of the second group includes the lens L3 with its concave surface facing the image-plane side, the beam is made to slightly diverge at the concave surface, facing the image-plane side, of the lens L3, and it is possible to correct the comatic aberration and axial chromatic aberration produced in the lens L2 of the second group.

Furthermore, in the third group having negative power includes the compound lens in which the biconvex lens L4 and the biconcave lens L5, from the object side, are joined, the beam that is made to slightly diverge by the surface at the image-plane side of the lens L3 is slightly converged by the convex surface at the object side of the biconvex lens L4. Accordingly, it is possible to prevent the ray height inside the compound lens from becoming high, which allows the outer diameter of the lenses to be reduced.

At the joining face of the biconvex lens L4 and the biconcave lens L5, it is possible to correct spherical aberration produced in the first group, the second group, and at the object-plane side of the biconvex lens L4 and axial chromatic aberration produced in the first group and the lens L2 in the second group. By making the beam diverge at the concave surface at the image-plane side of the biconcave lens L5, it is possible to correct undercorrected spherical aberration, and it is possible to correct axial chromatic aberration. At this surface, it is also possible to correct comatic aberration produced in the lens L2 and the biconvex lens L4.

Because the fourth group having positive power includes the positive lens L6 whose convex surface faces the object side, it is possible to substantially collimate the diverging beam emerging from the third group. By making the convex surface of the fourth group face the object side, it is possible to prevent the ray height inside the positive lens L6 from increasing, which allows the outer diameter of the lenses to be reduced.

The fifth group is given positive power overall in order to converge the beam substantially collimated after passing through the fourth group. By using the compound lens in the fifth group, it is possible to correct, at the joining face thereof, the spherical aberration, the axial chromatic aberration, and the comatic aberration produced in the fourth group at that time.

Therefore, with the immersion objective optical system according to the present invention, having such a configuration, it is possible to realize an immersion objective optical system whose outer diameter is reduced and whose overall length is increased, in which chromatic aberrations are well-corrected, and which is suitable for in vivo examination with a high numerical aperture.

In the above-described invention, it is preferable that conditional expression (1) below be satisfied:

$$0.03 < |F_{12}/F_3| < 0.13 \qquad (1)$$

where $F_3$ is the focal length of the third group; and $F_{12}$ is the combined focal length from the first group to the second group.

When $|F_{12}/F_3|$ is 0.03 or below, the Petzval sum increases and the image plane curvature becomes large. When $|F_{12}/F_3|$ is 0.13 or above, the negative power of the third group becomes too strong and the positive powers of the first group and the second group become too weak. In either case, because the beam diameter becomes too large, the outer diameter of the lenses must be made large, which results in the drawback that the optical system is highly invasive to a living organism.

In the above-described invention, it is preferable that conditional expression (2) below be satisfied:

$$0.8 < |\beta \cdot F_{14}/F_5| < 1.2 \qquad (2)$$

where $\beta$ is the magnification of the immersion objective optical system; $F_{14}$ is the combined focal length from the first group to the fourth group; and $F_5$ is the focal length of the fifth group.

If $|\beta \cdot F_{14}/F_5|$ is 0.8 or less, the power of the first group to the fourth group is too strong and the level of aberrations produced becomes large, therefore making it difficult to correct the aberrations with the fifth group. If $|\beta F_{14}/F_5|$ is 1.2 or above, the power of the first group to the fourth group is decreased, and therefore, the level of aberrations produced can be reduced; however, because the beam diameter is increased, it is necessary to increase the outer diameter of the lens, which results in the drawback that it becomes highly invasive to a living organism.

In the above-described invention, it is preferable that conditional expressions (3), (4), and (5) below be satisfied:

$$v_4 - v_5 > 40 \qquad (3)$$

$$0.12 < n_5 - n_4 < 0.22 \qquad (4)$$

$$1.4 < |R_{40}/R_{45}| < 1.9 \qquad (5)$$

Where $v_4$ and $v_5$ are Abbe numbers, at the d-line, of the biconvex lens L4 and the biconcave lens L5, respectively; $n_4$ and $n_5$ are refractive indexes, at the d-line, of the biconvex lens L4 and the biconcave lens L5, respectively; and $R_{40}$ and $R_{45}$ are radii of curvature at the object side of the biconvex lens L4 and a joining face of the biconvex lens L4 and the biconcave lens L5, respectively.

Because the compound lens formed of the biconvex lens L4 and the biconcave lens L5 in the third group corrects spherical aberration, it is preferable that the refractive index difference be made small and, furthermore, that the radius of curvature of the joining face of the biconvex lens L4 and the biconcave lens L5 be made small. Accordingly, $n_5 - n_4$ is preferably smaller than 0.22. If $n_5 - n_4$ is 0.22 or more, because the radius of curvature of the joining face becomes large, spherical aberration and axial chromatic aberration are undercorrected. However, if $n_5 - n_4$ is 0.12 or less, the radius of curvature of the joining face becomes too small, which deteriorates the workability of the lens; therefore, $n_5 - n_4$ is preferably larger than 0.12. Thus, the refractive indexes of the biconvex lens L4 and the biconcave lens L5 preferably satisfy conditional expression (4).

To optimize the amount of correction of the spherical aberration with respect to the radius of curvature of the joining surface, it is preferable to satisfy conditional expression (5). When $|R_{40}/R_{45}|$ is 1.4 or less, the amount of spherical aberration produced is too large and, when considering the overall length of the system, cannot be sufficiently corrected. When $|R_{40}/R_{45}|$ is 1.9 or more, the spherical aberration is overcorrected at the joining face, and when considering the overall system, the spherical aberration is overcorrected.

To correct the axial chromatic aberration, it is preferable to use a material having a low dispersion for the biconvex lens L4 and a material having a high dispersion for the biconcave lens L5. More specifically, it is preferable that conditional expression (3) be satisfied. By satisfying it, sufficient correction of the axial chromatic aberration is achieved, but if it is not satisfied, the axial chromatic aberration is undercorrected.

In the above-described invention, it is preferable that conditional expressions (6), (7), and (8) below be satisfied:

$$n_3 < 1.65 \qquad (6)$$

$$v_3 < 50 \qquad (7)$$

$$3 < |R_3/F_{12}| < 5 \qquad (8)$$

where $n_3$ is a refractive index, at the d-line, of the lens L3; $v_3$ is an Abbe number, at the d-line, of the lens L3; $R_{3_I}$ is a radius of curvature at the image-plane side of the lens L3; and $F_{12}$ is a combined focal length of the first group and the second group.

Furthermore, for the material of the lens L3, it is preferable to use a material having a low refractive index and high dispersion. By using a material having a low refractive index and high dispersion for the lens L3 and making the surface at the image-plane side concave, comatic aberration and axial chromatic aberration can be well-corrected. Specifically, it is preferable that conditional expressions (6) and (7) be satisfied.

If the lens L3 does not satisfy conditional expression (7), axial chromatic aberration produced from the first group to the fourth group is not completely corrected, and the axial chromatic aberration of the overall optical system is undercorrected. If condition (6) is satisfied, the beam, after passing through the second group, does not diverge excessively, even though the radius of curvature at the image-plane side of the lens L3 is reduced to increase the amount of correction of the comatic aberration and axial chromatic aberration; therefore, it is possible to ensure that the diameter of the beam incident on the third group does not become large. If conditional expression (6) is not satisfied, either the radius of curvature at the image-plane side of the lens L3 is too large, meaning that sufficient correction of the comatic aberration and axial chromatic aberration cannot be achieved, or, even if the radius of curvature is small, the negative power at the image-plane side of the lens L3 is too strong, which results in the problem that the beam diverges excessively after passing through the second group and the beam diameter at the third group becomes too large.

In order to balance correction of the comatic aberration and axial chromatic aberration produced in the first group and the second group and matching the beam divergence after passing through the second group, it is preferable that the radius of curvature $R_{3_I}$ at the image-plane side of the lens L3 satisfy conditional expression (8). When $|R_{3_I}/F_{12}|$ is 3 or less, the divergence angle of the beam after passing through the second group is large; therefore, the beam diameter at the third group is large, resulting in the problem that the outer diameter of the lenses becomes large. When $|R_{3_I}/F_{12}|$ 5 or more, the negative power at the image-plane side of the lens L3 is small, and therefore, the comatic aberration and axial chromatic aberration are undercorrected.

In the invention described above, it is preferable that the lens at the extreme object side in the fifth group be a compound lens in which a negative lens L7 and a positive lens L8 are joined, and conditional expression (9) below be satisfied:

$$0.2 < F_{14}^2 \cdot \{(n_5-1)/R_{5_I}^2 + (n_7-n_8)/R_{78}^2\} < 0.4 \quad (9)$$

where $F_{14}$ is a combined focal length from the first group to the fourth group; $n_5$, $n_7$, and $n_8$ are refractive indexes, at the d-line, of the biconcave lens L5, the negative lens L7, and the positive lens L8, respectively; and $R_{5_I}$ and $R_{78}$ are a radius of curvature at the image-plane side of the biconcave lens L5 and radius of curvature of a joining face of the negative lens L7 and the positive lens L8.

Spherical aberration is corrected at the image-plane side of the biconcave lens L5 and at the joining face of the negative lens L7 and the positive lens L8; conditional expression (9) is the condition for properly setting the amount of spherical aberration which is corrected at the surface at the image-plane side of the biconcave lens L5 and at the joining face of the negative lens L7 and the positive lens L8. If the conditional expression exceeds the lower limit, the spherical aberration is undercorrected, and if the conditional expression exceeds the upper limit, the spherical aberration is overcorrected.

In the above-described invention, the fifth group preferably includes, from the object side, the compound lens in which the negative lens L7 and the positive lens L8 are joined; a positive lens L9; and a compound lens in which a positive lens L10 and a negative lens L11 whose concave surface faces the image-plane side are joined.

Spherical aberration, axial chromatic aberration, and comatic aberration produced in the fourth group are corrected at the joining face of the negative lens L7 and the positive lens L8. Also, it is possible to correct astigmatism at the joining face of the positive lens L10 and the negative lens L11.

The present invention provides an advantage in that it is possible to realize an objective optical system whose outer diameter is reduce, whose overall length is increased, in which chromatic aberrations are well-corrected, and which is suitable for in-vivo examination with a large numerical aperture.

DETAILED DESCRIPTION OF THE INVENTION

An immersion objective optical system 1 according to a first embodiment of the present invention will be described below with reference to FIG. 1.

Figure 1:
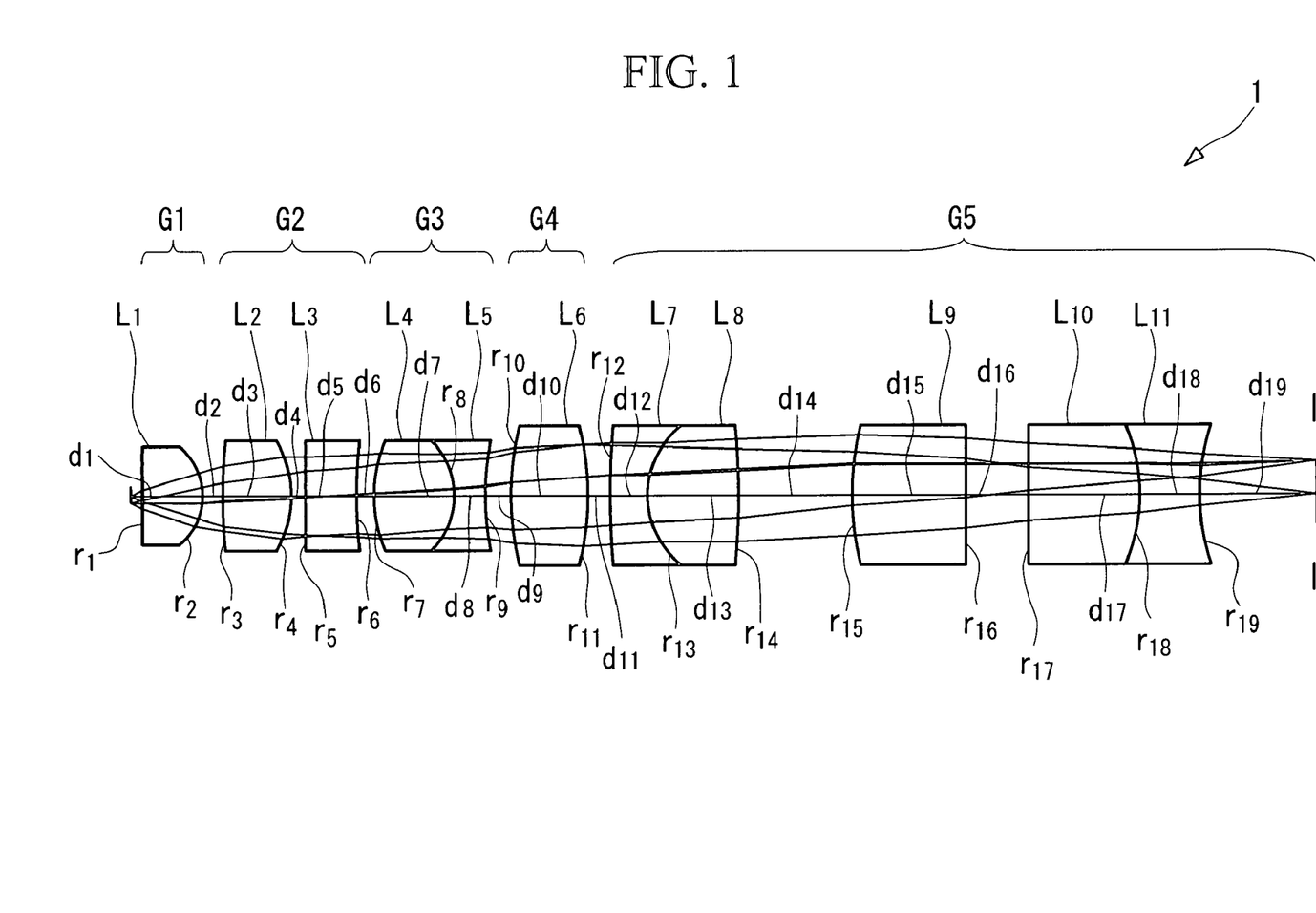
FIG. 1 is a lens arrangement showing an immersion objective optical system according to a first embodiment of the present invention.

As shown in FIG. 1, the immersion objective optical system 1 according to this embodiment is formed of a first group G1 having positive power, a second group G2 having positive power, a third group G3 having negative power, a fourth group G4 having positive power, and a fifth group G5 having positive power, in this order from an object side.

The first group G1 is formed of a single plano-convex lens L1 whose convex surface faces the image-plane side. That is, the object-side surface of the plano-convex lens L1 is a substantially flat surface.

The second group G2 is formed of a lens L2 disposed at the object side and a lens L3 disposed at the image-plane side. The lens L2 is disposed such that a convex surface thereof faces the object side. The lens L3 is disposed such that a concave surface thereof faces the image-plane side.

The third group G3 is constituted by a compound lens formed by joining a biconvex lens L4 disposed at the object side and a biconcave lens L5 disposed at the image-plane side.

The fourth group G4 is formed of a positive lens L6 whose convex surface faces the object side.

The fifth group G5 includes a compound lens formed of a negative meniscus lens L7 and a biconvex lens L8; a plano-convex lens L9 whose convex surface faces the object side; and a compound lens formed of a plano-convex lens L10 whose substantially flat surface faces the object side and a biconcave lens L11 and has positive power overall.

With the immersion objective optical system 1 according to this embodiment, configured as described above, due to the substantially flat surface at the object side of the plano-convex lens L1 in the first group G1, it is possible to make it difficult for air bubbles to get between the immersion objective optical system and the object. Also, the convex surface at the image-plane side of the plano-convex lens L1 can suppress the occurrence of spherical aberration and comatic aberration close to the aplanatic condition.

In the second group G2, light is refracted by the convex surface at the object-side of the lens L2, the divergence angle of the beam is reduced inside the lens L2, and the ray height is prevented from becoming high; as a result, it is possible to reduce the outer diameter of the lens. The light is then further refracted at the convex surface at the image-plane side of the lens L2, and the divergence of the beam inside the lens L2 can be further reduced.

By making the beam slightly diverge at the concave surface at the image-plane side of the lens L3, it is possible to correct comatic aberration and axial chromatic aberration occurring in the lens L2.

In the third group G3, by making the beam which was diverged by the second group G2 slowly converge at the convex surface at the object side of the biconvex lens L4, it is possible to prevent the ray height from becoming too high inside the compound lens. Using the joining surface, it is possible to correct spherical aberration produced at the object side of the second group G2 and the biconvex lens L4 and axial chromatic aberration produced in the first group G1 and the biconvex lens L4.

By making the beam diverge at the concave surface at the image-plane side of the biconcave lens L5, it is possible to correct spherical aberration which is under-corrected in the lenses from the plano-convex lens L1 to the biconvex lens L4, and it is also possible to correct axial chromatic aberration. In addition, at this surface, it is also possible to correct comatic aberration produced in the lens L2 and the biconvex lens L4.

In the fourth group G4, the diverging beam emerging from the biconcave lens L5 is substantially collimated. The ray height can be prevented from becoming too high inside the biconvex lens L6 by means of the convex surface at the object side of the biconvex lens L6, which prevents the outer diameter of the lens from becoming large.

In the fifth group G5, after passing through the biconvex lens L6, the substantially collimated beam is converged by the compound lens formed of the negative meniscus lens L7 and the biconvex lens L8, and by the plano-convex lens L9. At the joining surface of the negative meniscus lens L7 and the biconvex lens L8, it is possible to correct spherical aberration, axial chromatic aberration, and comatic aberration produced in the fourth group G4.

Furthermore, astigmatism can be corrected at the joining surface of the plano-convex lens L10 and the biconcave lens L11.

With the immersion objective optical system 1 according to this embodiment, having such a configuration, it is possible to realize an objective optical system whose outer diameter is reduced, whose overall length is increased, in which chromatic aberrations are well corrected, and which is suitable for in-vivo examination with a high numerical aperture.

It is particularly preferable to satisfy the following conditional expressions (1) to (9).
Namely:

$$0.03 < |F_{12}/F_3| < 0.13 \quad (1)$$

$$0.8 < |\beta F_{14}/F_5| < 1.2 \quad (2)$$

$$\nu_4 - \nu_5 > 40 \quad (3)$$

$$0.12 < n_5 - n_4 < 0.22 \quad (4)$$

$$1.4 < |R_{40}/R_{45}| < 1.9 \quad (5)$$

$$n_3 < 1.65 \quad (6)$$

$$\nu_3 < 50 \quad (7)$$

$$3 < |R_{31}/F_{12}| < 5 \quad (8)$$

$$0.2 < F_{14}^2 \cdot \{(n_5-1)/R_{5i}^2 + (n_7-n_8)/R_{78}^2\} < 0.4 \quad (9)$$

Here, $F_3$ is the focal length of the third group; $F_{12}$ is the combined focal length of the first group and the second group; $\beta$ is the magnification of the immersion objective optical system; $F_{14}$ is the combined focal length from the first group to the fourth group; $F_5$ is the focal length of the fifth group; $\nu_4$ and $\nu_5$ are the Abbe numbers, at the d-line, of the biconvex lens L4 and the biconcave lens L5, respectively; $n_4$ and $n_5$ are the refractive indexes, at the d-line, of the biconvex lens L4 and the biconcave lens L5, respectively; $R_{40}$ and $R_{45}$ are, respectively, the radii of curvature at the object side of the biconvex lens L4 and the joining surface of the biconvex lens L4 and the biconcave lens L5; $n_3$ is the refractive index, at the d-line, of the lens L3; $\nu_3$ is the Abbe number, at the d-line, of the lens L3; $R_{31}$ is the radius of curvature at the image-plane side of the lens L3; $F_{12}$ is the combined focal length of the first group and the second group; $F_{14}$ is the combined focal length from the first group to the fourth group; $n_5$, $n_7$, and $n_8$ are the refractive indexes, at the d-line, of the lens L5, the lens L7, and the lens L8, respectively; and $R_{5i}$ and $R_{78}$ are the radius of curvature at the image-plane side of the lens L5 and the radius of curvature at the joining surface of the lens L7 and the lens L8.

When $|F_{12}/F_3|$ is 0.03 or below, the Petzval sum increases and the image plane curvature becomes large. When $|F_{12}/F_3|$ is 0.13 or above, the negative power of the third group becomes too strong and the positive powers of the first group and the second group become too weak. In either case, because the beam diameter becomes too large, the outer diameter of the lenses must be made large, which results in the drawback that the optical system is highly invasive to a living organism.

If $|\beta \cdot F_{14}/F_5|$ is 0.8 or less, the power of the first group to the fourth group is too strong and the level of aberrations produced becomes large, therefore making it difficult to correct the aberrations with the fifth group. If $|\beta \cdot F_{14}/F_5|$ is 1.2 or above, the power of the first group to the fourth group is decreased, and therefore, the level of aberrations produced can be reduced; however, because the beam diameter is increased, it is necessary to increase the outer diameter of the lens, which results in the drawback that it becomes highly invasive to a living organism.

Because the compound lens formed of the biconvex lens L4 and the biconcave lens L5 in the third group corrects spherical aberration, it is preferable that the refractive index difference be made small and, furthermore, that the radius of curvature of the joining face of the biconvex lens L4 and the biconcave lens L5 be made small. Accordingly, $n_5 - n_4$ is preferably smaller than 0.22. If $n_5 - n_4$ is 0.22 or more, because the radius of curvature of the joining face becomes large, spherical aberration and axial chromatic aberration are undercorrected. However, if $n_5 - n_4$ is 0.12 or less, the radius of curvature of the joining face becomes too small, which deteriorates the workability of the lens; therefore, $n_5 - n_4$ is preferably larger than 0.12. Thus, the refractive indexes of the biconvex lens L4 and the biconcave lens L5 preferably satisfy conditional expression (4).

To optimize the amount of correction of the spherical aberration with respect to the radius of curvature of the joining surface, it is preferable to satisfy conditional expression (5). When $|R_{40}/R_{45}|$ is 1.4 or less, the amount of spherical aberration produced is too large and, when considering the overall length of the system, cannot be sufficiently corrected. When $|R_{40}/R_{45}|$ is 1.9 or more, the spherical aberration is overcorrected at the joining face, and when considering the overall system, the spherical aberration is overcorrected.

To correct the axial chromatic aberration, it is preferable to use a material having a low dispersion for the biconvex lens L4 and a material having a high dispersion for the biconcave lens L5. More specifically, it is preferable that conditional expression (3) be satisfied. By satisfying it, sufficient correction of the axial chromatic aberration is achieved, but if it is not satisfied, the axial chromatic aberration is undercorrected.

Furthermore, for the material of the plano-concave lens L3, it is preferable to use a material having a low refractive index and high dispersion. By using a material having a low refractive index and high dispersion for the plano-concave lens L3 and making the surface at the image-plane side concave, comatic aberration and axial chromatic aberration can be well-corrected. Specifically, it is preferable that conditional expressions (6) and (7) be satisfied.

If the plano-concave lens L3 does not satisfy conditional expression (7), axial chromatic aberration produced from the first group to the fourth group is not corrected, and the axial chromatic aberration of the overall optical system is undercorrected. If condition (6) is satisfied, the beam, after passing through the second group, does not diverge excessively, even though the radius of curvature at the image-plane side of the plano-concave lens L3 is reduced to increase the amount of correction of the comatic aberration and axial chromatic aberration; therefore, it is possible to ensure that the diameter of the beam incident on the third group does not become large. If conditional expression (6) is not satisfied, either the radius of curvature at the image-plane side of the plano-concave lens L3 is too large, meaning that sufficient correction of the comatic aberration and axial chromatic aberration cannot be achieved, or, even if the radius of curvature is small, the negative power at the image-plane side of the plano-concave lens L3 is too strong, which results in the problem that the beam diverges excessively after passing through the second group and the beam diameter at the third group becomes too large.

In order to balance correction of the comatic aberration and axial chromatic aberration produced in the first group and the second group and matching the beam divergence after passing through the second group, it is preferable that the radius of curvature $R_{3_i}$ at the image-plane side of the plano-concave lens L3 satisfy conditional expression (8). When $|R_{3_i}/F_{12}|$ is 3 or less, the divergence angle of the beam after passing through the second group is large; therefore, the beam diameter at the third group is large, resulting in the problem that the outer diameter of the lens becomes large. When $|R_{3_i}/F_{12}|$ 5 or more, the negative power at the image-plane side of L3 is small, and therefore, the comatic aberration and axial chromatic aberration are undercorrected.

Spherical aberration is corrected at the image-plane side of the biconcave lens L5 and at the joining face of the negative meniscus lens L7 and the biconvex lens L8; conditional expression (9) is the condition for properly setting the amount of spherical aberration which is corrected at the surface at the image-plane side of the biconcave lens L5 and at the joining face of the negative meniscus lens L7 and the biconvex lens L8. If the conditional expression exceeds the lower limit, the spherical aberration is undercorrected, and if the conditional expression exceeds the upper limit, the spherical aberration is overcorrected.

Figure 2:
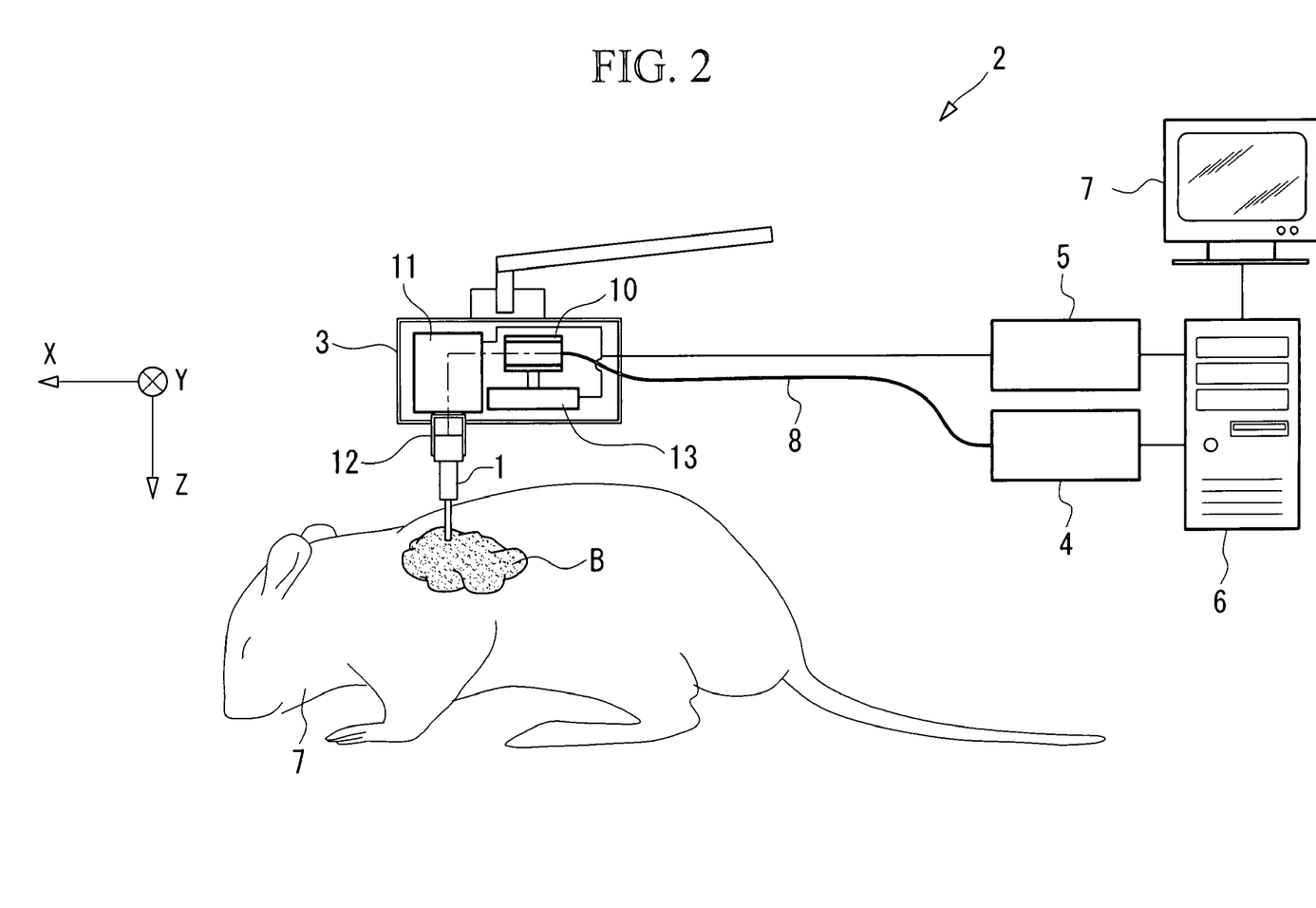
FIG. 2 is an overall structural diagram showing a laser-scanning confocal microscope system provided with the immersion objective optical system in FIG. 1.

FIG. 2 shows an example in which the immersion objective optical system 1 according to this embodiment is connected to a compact laser-scanning confocal optical system 2.

An excitation laser light source, which is not shown in the drawing, is provided inside an optical unit 4, laser light passes through an optical fiber 8 to be guided to a scanning unit 3, and after being collimated in a collimator optical system 10, the emission direction of the light is scanned in an optical scanner 11 and is imaged at an intermediate image position by a pupil-projection optical system 12. The pupil-projection optical system 12 and the immersion objective optical system 1 are connected, and the image formed by the pupil-projection optical system 12 is re-imaged at the object (examination site B of a living organism 7) by the immersion objective optical system 1 according to this embodiment, which is shown in FIG. 1, to excite the object (biological tissue, dye, etc.).

Fluorescence generated in the object B passes through the immersion objective optical system 1, the pupil-projection optical system 12, the optical scanner 11, the collimator optical system 10, and the optical fiber 8, and after being split off from the excitation light by a dichroic mirror (not shown) inside the optical unit 4, it passes through an excitation-light cutting filter, is detected at a detector, and is displayed by a monitor 7, via a computer 6.

In this embodiment, the core of the optical fiber 8 serves as a confocal pinhole, and when examining the object, because light from regions outside the vicinity of the part which is in focus is cut, it is possible to carry out examination with a high SN ratio. Furthermore, by operating a driving mechanism 13 inside the scanning unit 3, using a control unit 5, to change the distance between the collimator lens 10 and the optical fiber 8, it is possible to adjust the examination position in the longitudinal direction (Z direction) of the immersion objective optical system 1. Therefore, in combination with the scanning in the lateral directions (X and Y directions) by the optical scanner 11, it is also possible to acquire a three-dimensional image.

Next, an immersion objective optical system 20 according to a second embodiment of the present invention will be described with reference to FIG. 3.

Figure 3:
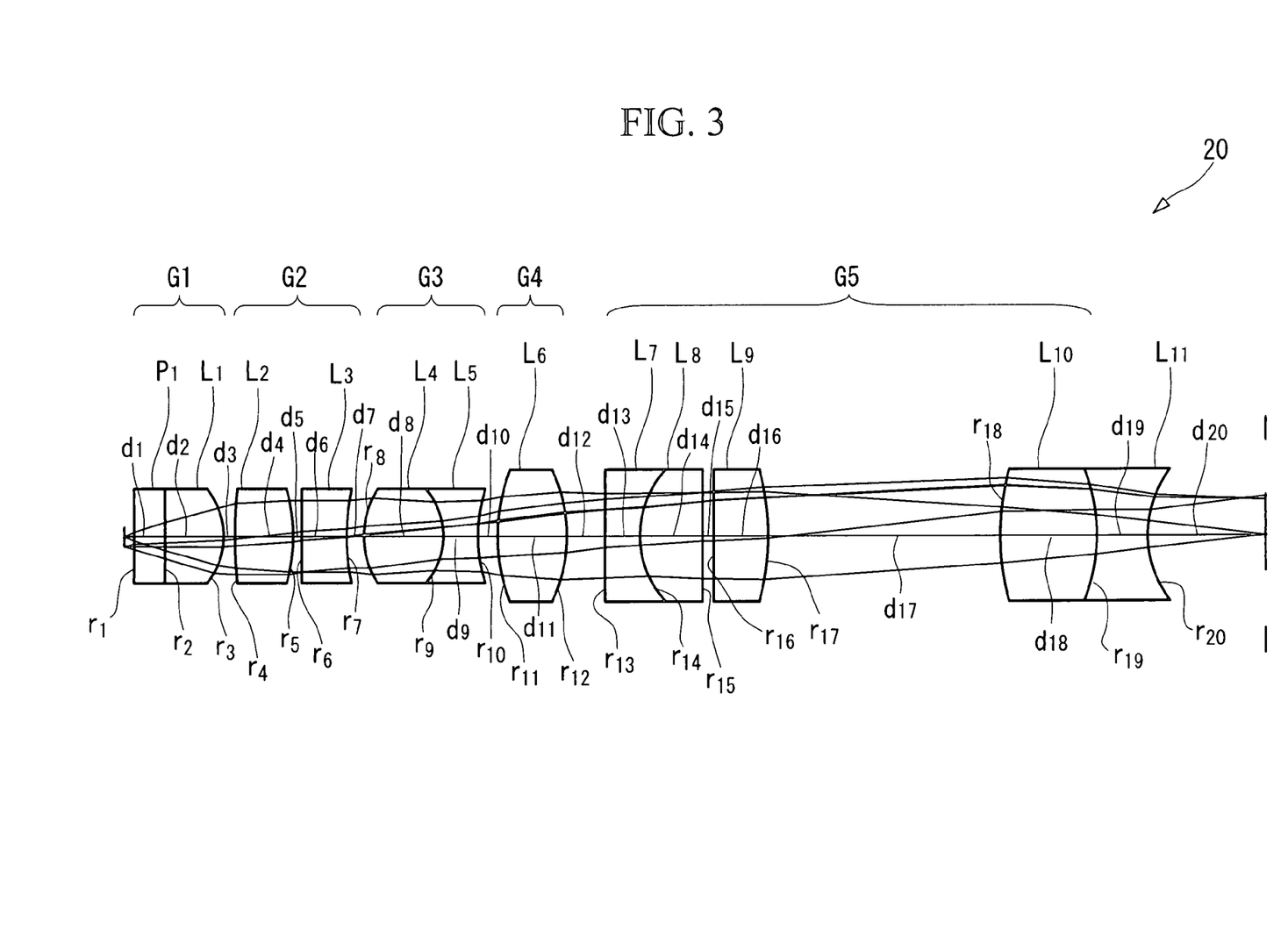
FIG. 3 is a lens arrangement showing an immersion objective optical system according to a second embodiment of the present invention.

As shown in FIG. 3, the immersion objective optical system 20 according to this embodiment is similar to the first embodiment in that it is formed of, in order from the object side, a first group G1 having positive power, a second group G2 having positive power, a third group G3 having negative power, a fourth group G4 having positive power, and a fifth group G5 having positive power. The immersion objective optical system 20 according to this embodiment differs in the constituent elements of each lens group.

The group G1 is formed of a compound lens of a parallel flat plate P1 and a plano-convex lens L1. The parallel flat plate P1 is disposed at the object side, and the plano-convex lens L1 is disposed with its convex surface facing the image-plane side. Accordingly, the first group has positive power overall.

The second group G2 is formed of a biconvex lens L2 and a plano-concave lens L3. The biconvex lens L2 is disposed at the object side, and the second group G2 has positive power overall.

The third group G3 is formed of a compound lens in which a biconvex lens L4 and a biconcave lens L5 are joined. The biconvex lens L4 is disposed at the object side, and the third group has negative power overall.

The fourth group G4 is formed of a biconvex lens L6 and has positive power.

The groups from the second group G2 to the fourth group G4 are the same as in the immersion objective optical system 1 according to the first embodiment.

The fifth group G5 is formed of a compound lens of a plano-concave lens L7 and a plano-convex lens L8; a plano-convex lens L9; and a compound lens of a biconvex lens L10 and a biconcave lens L11, disposed in this order from the object side. The plano-concave lens L7 has a substantially planar surface disposed at the object side. The fifth group G5 has positive power overall.

With the immersion objective optical system 20 according to this embodiment, having such a configuration, in the first group G1, as the refractive index of the plano-convex lens L1 in the first group G1 is made larger than that of the immersion objective optical system 1 according to the first embodiment and the radius of curvature of the convex surface at the image-plane side is increased, it is possible to increase the thickness of the plano-convex lens L1 itself. Accordingly, the workability of the lens can be improved over that of the first embodiment, and the manufacturing costs can be reduced.

Compared to the first embodiment, it is possible to reduce the occurrence of astigmatism by increasing the refractive index of the plano-convex lens L1. Therefore, it is possible to ensure a larger observation region than the immersion objective optical system 1 according to the first embodiment. Also, if the resistance of the plano-convex lens L1 to water or biological tissue is not high, it is possible to protect the plano-convex lens L1 by attaching P1 having good resistance to the tip thereof.

In the fifth group, a beam of light that is substantially collimated after passing through the biconvex lens L6 in the fourth group is converged by the plano-convex lens L9 and the compound lens of the biconvex lens L10 and the biconcave lens L11. Spherical aberration, axial chromatic aberration, and comatic aberration produced in the fourth group G4 can be corrected at the joining face of the plano-concave lens L7 and the plano-convex lens L8. Also, astigmatism can be corrected at the joining face of the biconvex lens L10 and the biconcave lens L11.

The effects of the other lenses from groups G2 to G4 are the same as in the first embodiment.

With the immersion objective optical system 20 according to this embodiment, having such a configuration, similarly to the immersion objective optical system 1 according to the first embodiment, it is possible to realize an objective optical system whose outer diameter is reduced, whose overall length is increased, in which chromatic aberrations are well-corrected, and which is suitable for in vivo examination with a high numerical aperture. In particular, it is preferable that conditional expressions (1) to (9) described above be satisfied.

Similarly to the first embodiment, the immersion objective optical system 20 according to this embodiment can also be connected to the laser-scanning confocal optical system 2.

Next, an immersion objective optical system 30 according to a third embodiment of the present invention will be described with reference to FIG. 4.

Figure 4:
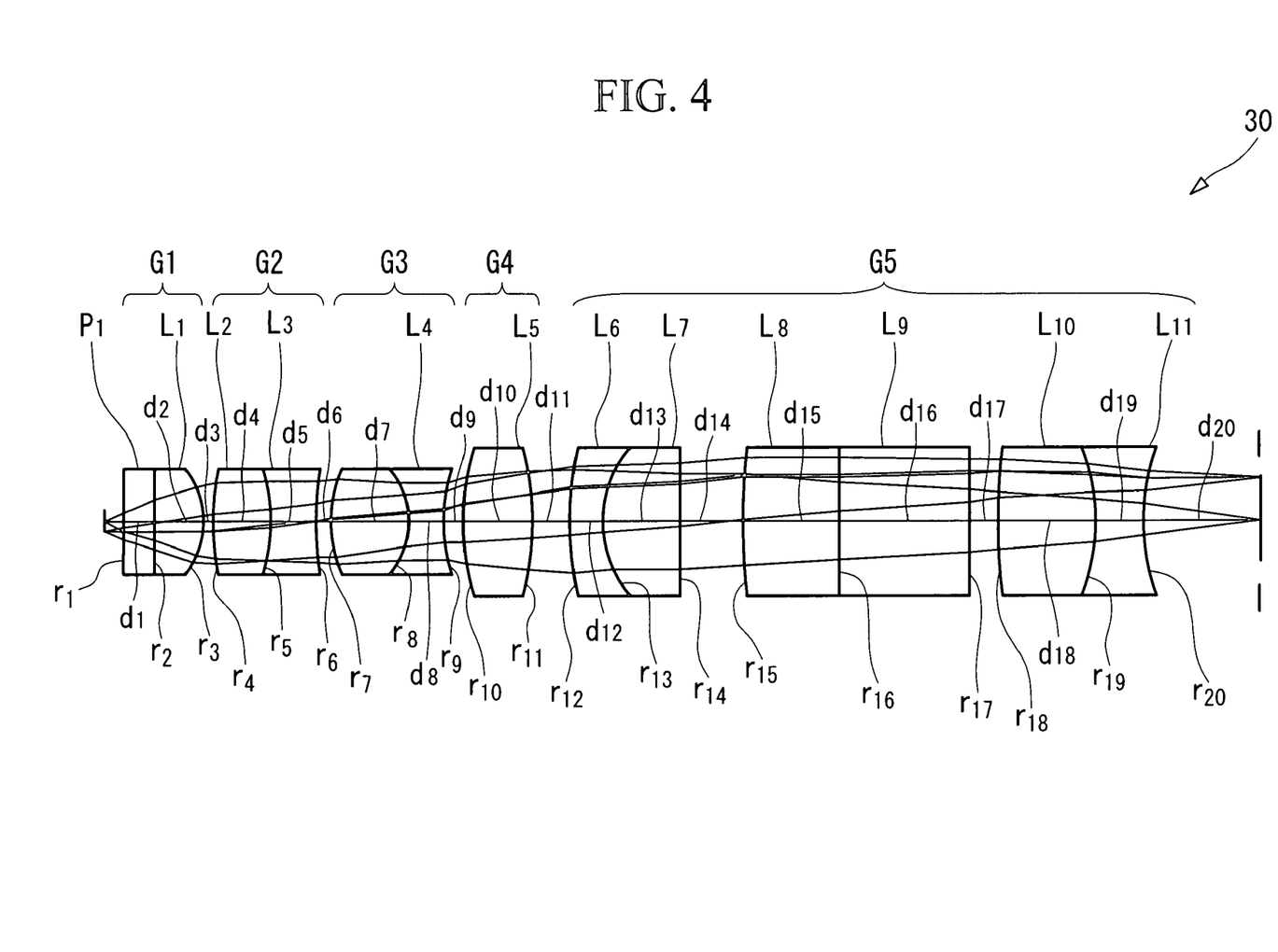
FIG. 4 is a lens arrangement showing an immersion objective optical system according to a third embodiment of the present invention.
Figure 5A:
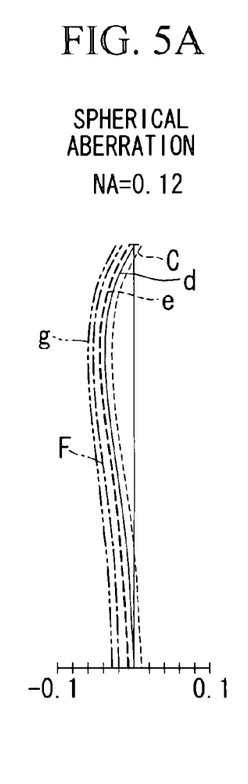
FIGS. 5A, 5B, 5C, 5D, 5E, and 5F are diagrams showing the aberrations caused by an Example of the immersion objective optical system in FIG. 1.
Figures 5B, 5C, 5D, 5E:
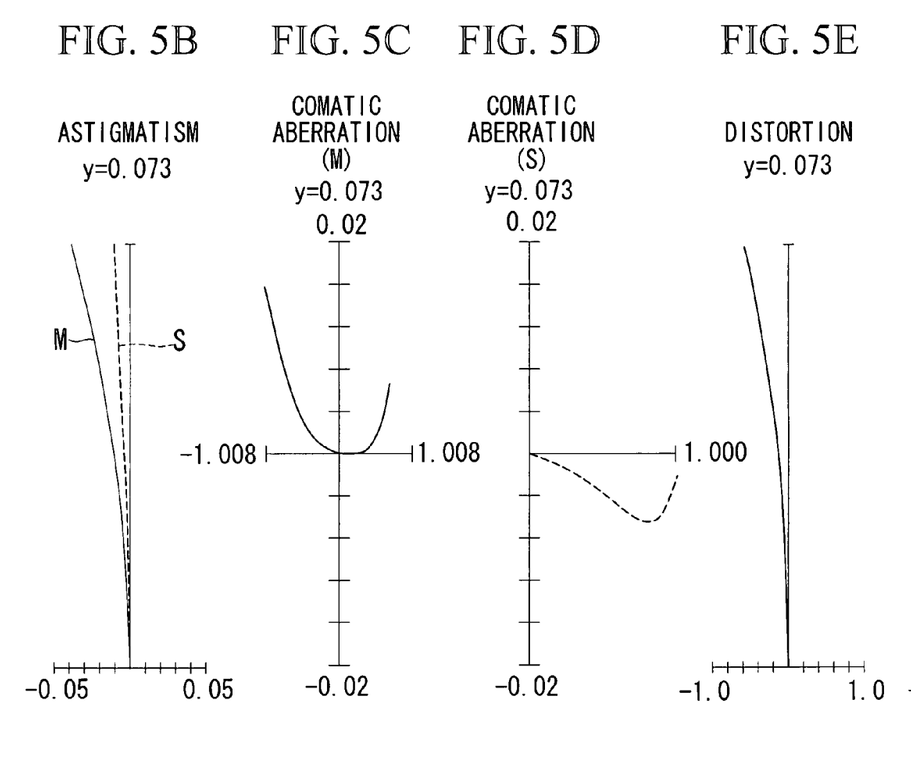
Figure 5F:
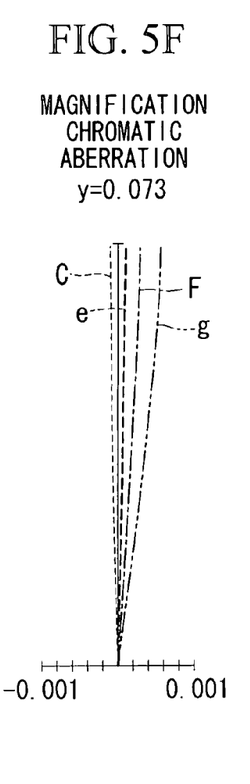
Figures 6A, 6B, 6C, 6D, 6E:
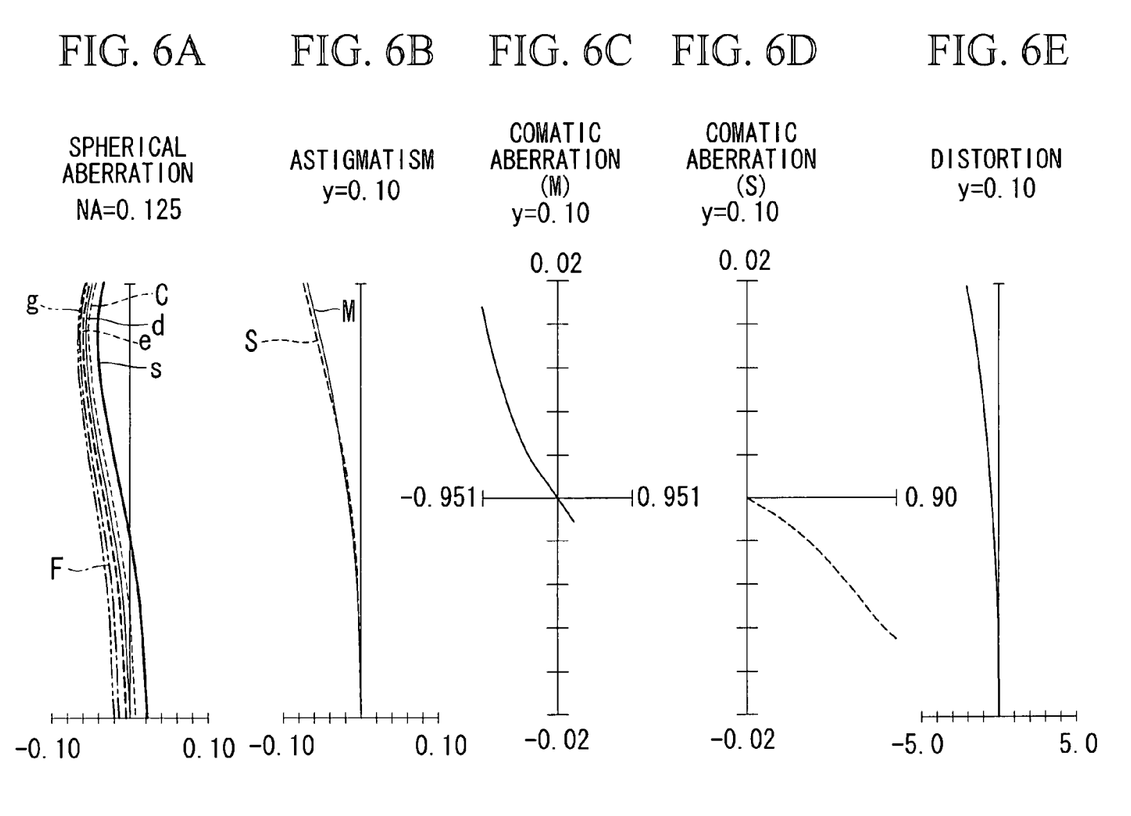
FIGS. 6A, 6B, 6C, 6D, 6E, and 6F are diagrams showing the aberrations caused by an Example of the immersion objective optical system in FIG. 3.
Figure 6F:
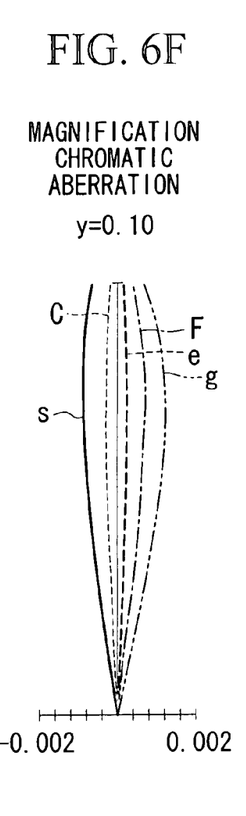
Figure 7A:
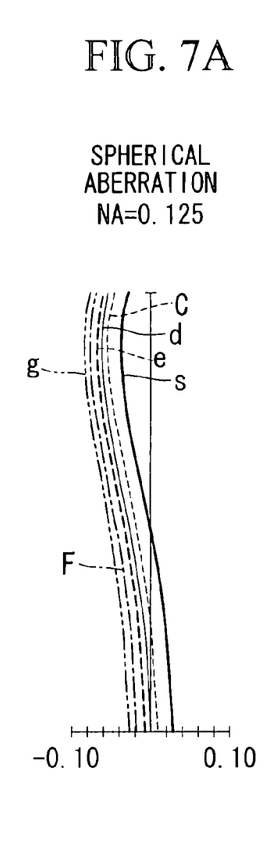
FIGS. 7A, 7B, 7C, 7D, 7E, and 7F are diagrams showing the aberrations caused by an Example of the immersion objective optical system in FIG. 4.
Figures 7B, 7C:
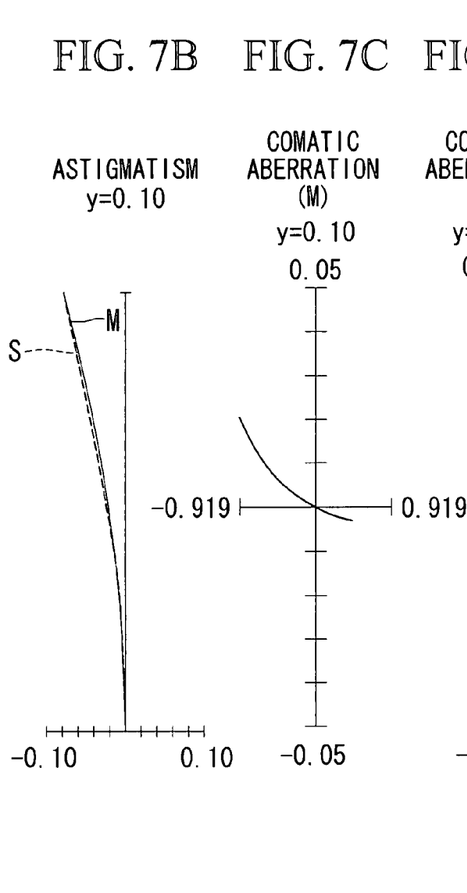
Figures 7D, 7E:
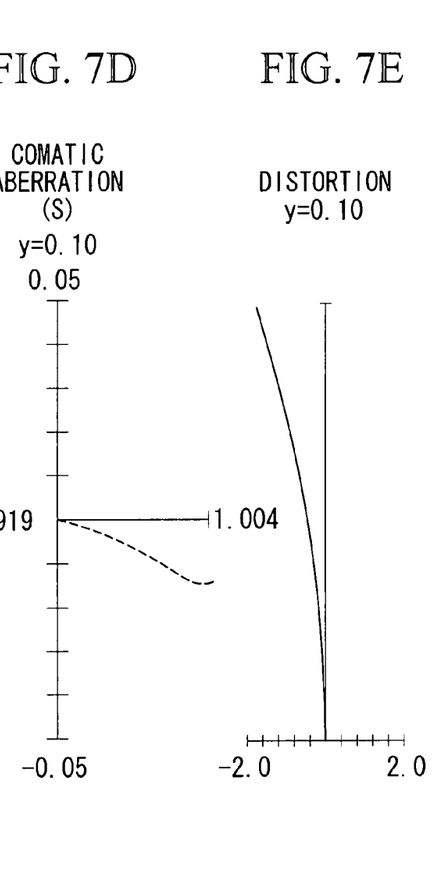
Figure 7F:
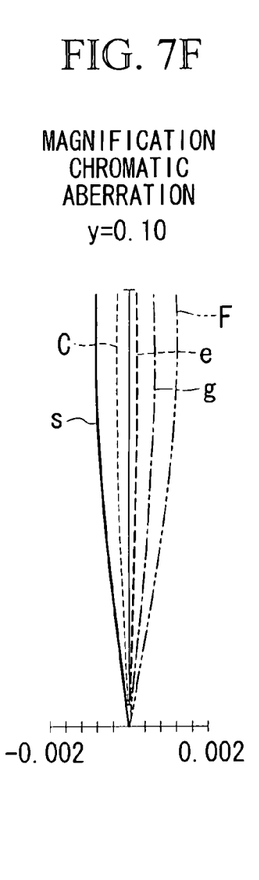

As shown in FIG. 4, the immersion objective optical system 30 according to this embodiment is similar to those in the first and second embodiments in that it is formed of, in order from the object side, a first group G1 having positive power, a second group G2 having positive power, a third group G3 having negative power, a fourth group G4 having positive power, and a fifth group G5 having positive power. The immersion objective optical system 30 according to this embodiment differs in the constituent elements of each lens group and is different from those in the first and second embodiments in that the working distance is increased.

The first group G1 is formed on a compound lens of a parallel flat plate P1 and a plano-convex lens L1. The plano-convex lens L1 is disposed with its convex surface facing the image-plane side. The first group G1 has positive power overall.

The second group G2 is formed of a compound lens in which a biconvex lens L2 and a biconcave lens L3 are joined. The biconvex lens L2 is disposed at the object side, the biconcave lens L3 is disposed at the image-plane side, the lenses are disposed with a convex surface facing the object side and a concave surface facing the image-plane side.

The third group G3 is formed of a compound lens in which a biconvex lens L4 and a biconcave lens L5 are joined. The third group G3 has negative power overall.

The fourth group G4 is formed of a biconvex lens L6.

The fifth group G5 is formed of a compound lens of a negative meniscus lens L7 and a plano-convex lens L8; a compound lens of a plano-convex lens L9 and parallel flat plate P2; and a compound lens of a biconvex lens L10 and a biconcave lens L11. The fifth group G5 has positive power overall. Also, the biconvex lens L10 is provided to ensure an increased overall length.

With the immersion objective optical system 30 according to this embodiment, having such a configuration, in the second group G2, light is refracted by the convex surface at the object side of the biconvex lens L2, which reduces the divergence angle of the beam inside the biconvex lens L2, and it is thus possible to prevent the ray height from increasing. As a result, it is possible to reduce the outer diameter of the lens.

In addition, the beam is made to slight diverge at the concave surface at the image-plane side of the biconcave lens L3, which allows comatic aberration and axial chromatic aberration produced in the biconvex lens L2 to be corrected. Also, by joining the biconvex lens L2 and the biconcave lens L3, it is unnecessary to provide a gap between the biconvex lens L2 and the biconcave lens L3, which allows the number of components to be reduced and can prevent the spherical aberration from becoming worse due to error in the inter-surface separation. It is also possible to reduce the effect of aberrations even if the surface quality tolerance of the joining face of the biconvex lens L2 and the biconcave lens L3 is relaxed. Therefore, the surface quality tolerance of the lens can be relaxed and the manufacturing costs can be reduced.

In the fifth group G5, a light beam that is substantially collimated after passing through the biconvex lens L6 in the fourth group G4 can be made to converge by the compound lens of the negative meniscus lens L7 and the plano-convex lens L8; the compound lens of the plano-convex lens L9 and parallel flat plate P2; and the compound lens of the biconvex lens L10 and the biconcave lens L11.

Spherical aberration, axial chromatic aberration, and comatic aberration produced in the fourth group G4 can be corrected at the joining face of the negative meniscus lens L7 and the plano-convex lens L8. Also, astigmatism can be corrected at the joining face of the biconvex lens L10 and the biconcave lens L11.

The effects of the other lens groups G1, G3, and G4 are the same as in the second embodiment.

With the immersion objective optical system 30 according to this embodiment, having such a configuration, similarly to the immersion objective optical systems 1 and 20 of the first and second embodiments, it is possible to realize an objective optical system whose outer diameter is decreased, whose overall length is increased, in which chromatic aberrations are well-corrected, and which is suitable for in-vivo examination with a high numerical aperture. In particular, it is preferable that conditional expressions (1) to (9) described above be satisfied.

Like the first embodiment, the immersion objective optical system 30 according to this embodiment may also be connected to the laser-scanning confocal optical system 2.

FIRST EXAMPLE

An Example of the immersion objective optical system 1 according to the first embodiment will be described below with reference to FIGS. 1, 5A, 5B, 5C, 5D, 5E, and 5F and Table 1.

In FIG. 1 and Table 1, symbol r indicates the radius of curvature (mm) and symbol d indicates the distance between surfaces (mm), and in Table 1, symbol n indicates the refractive index at the d-line (587.56 nm) and symbol ν indicates the Abbe number $\nu=(n-1)/(n_F-n_c)$. Here, $n_F$ and $n_c$ are the refractive indexes at the F-line and the C-line, respectively.

TABLE 1

Object-side NA, 0.50; observation region φ 0.146 mm.

| Surface number | r | d | n | ν |
|---|---|---|---|---|
| object plane | ∞ | 0.098 (working distance) | 1.33304 (water) | 55.79 |
| 1 | ∞ | 0.55 | 1.51633 | 64.14 |
| 2 | −0.614 | 0.15 | | |
| 3 | 3.469 | 0.6 | 1.741 | 52.64 |
| 4 | −1.273 | 0.15 | | |
| 5 | ∞ | 0.45 | 1.6134 | 44.27 |
| 6 | 3.637 | 0.15 | | |
| 7 | 1.218 | 0.71 | 1.43875 | 94.93 |
| 8 | −0.674 | 0.29 | 1.6134 | 44.27 |
| 9 | 2.406 | 0.2 | | |
| 10 | 2.406 | 0.7 | 1.51633 | 64.14 |
| 11 | −2.681 | 0.2 | | |
| 12 | 5.961 | 0.34 | 1.7725 | 49.6 |
| 13 | 0.804 | 0.81 | 1.6779 | 55.34 |
| 14 | −10.104 | 1.03 | | |
| 15 | 3.746 | 1 | 1.7725 | 49.6 |
| 16 | ∞ | 0.56 | | |
| 17 | ∞ | 1 | 1.7725 | 49.6 |
| 18 | −1.425 | 0.51 | 1.51633 | 64.14 |
| 19 | 1.869 | 1.04 | | |

In the aberration plots in FIGS. 5A, 5B, 5C, 5D, 5E, and 5F, symbol NA indicates the numerical aperture at the image-plane side and symbol y indicates the image height, symbol M indicates the meridional plane and symbol S indicates the sagittal plane, and the magnification chromatic aberration is based on the d-line (587.56 nm).

The wavelength of the C-line is 656.27 nm, the wavelength of the d-line is 587.56 nm, the wavelength of the e-line is 546.07 nm, the wavelength of the F-line is 486.13 nm, and the wavelength of the g-line is 435.84 nm.

Regarding the lens diameters, that of the plano-convex lens L1 is 0.9 mm, those of lenses from the biconvex lens L2 to the biconcave lens L5 are 1 mm, and those of lenses from the biconvex lens L6 to the biconcave lens L11 are 1.3 mm; that is, only lenses with an extremely small diameter are used in the construction. Accordingly, the immersion objective optical system 1 of this Example is suitable for examining a site deep inside the body of a small animal, such as a mouse, with minimal invasiveness.

In the immersion objective optical system 1 of this Example, the overall length of the optical system from the tip to the image plane is 10.44 mm, which allows a construction in which, even when connecting a relay lens and CCD after the immersion objective optical system 1 and observing an image at a point slightly away from the living organism, it is difficult for the relay lens or CCD to come into contact with the living organism (its head etc.).

In order for the immersion objective optical system 1 according to this Example to obtain clear fluorescence images and high resolution, a numerical aperture of 0.5 should be ensured at the object side of the immersion objective optical system 1. Because axial chromatic aberration and magnification chromatic aberration are well-corrected, the objective optical system is suitable for white-light observation and fluorescence observation, and is particularly suitable as the objective optical system in a laser-scanning confocal microscope.

The working distance (WD) is 0.098 mm, so by placing the tip of the immersion objective optical system in close contact with the living organism, it is possible to carry out blur-free examination of the interior of the living organism.

By connecting the immersion objective optical system 1 of this Example to the laser-scanning confocal microscope system shown in FIG. 2, even if a pupil-projection optical system or scanning unit is connected after the objective optical system, the pupil-projection optical system or scanning unit can be disposed at a position separated from the living organism without contacting it.

SECOND EXAMPLE

Next, an Example of the immersion objective optical system 20 according to the second embodiment will be described below with reference to FIGS. 2, 6A, 6B, 6C, 6D, 6E, and 6F and Table 2.

In FIG. 2 and Table 2, symbol r indicates the radius of curvature (mm) and symbol d indicates the distance between surfaces (mm), and in Table 2, symbol n indicates the refractive index at the d-line (587.56 nm) and symbol ν indicates the Abbe number $\nu=(n-1)/(n_F-n_c)$. Here, $n_F$ and $n_c$ are the refractive indexes at the F-line and the C-line, respectively.

TABLE 2

Object-side NA, 0.50; observation region φ 0.2 mm.

| Surface number | r | d | n | ν |
|---|---|---|---|---|
| object plane | ∞ | 0.1 (working distance) | 1.33304 (water) | 55.79 |
| 1 | ∞ | 0.31 | 1.51633 | 64.14 |
| 2 | ∞ | 0.6 | 1.7725 | 49.6 |
| 3 | −0.804 | 0.1 | | |
| 4 | 3.127 | 0.6 | 1.741 | 52.64 |
| 5 | −2.339 | 0.1 | | |
| 6 | ∞ | 0.45 | 1.6134 | 44.27 |
| 7 | 2.339 | 0.18 | | |
| 8 | 1.108 | 0.81 | 1.43875 | 94.93 |
| 9 | −0.703 | 0.35 | 1.6134 | 44.27 |
| 10 | 1.566 | 0.2 | | |
| 11 | 2.107 | 0.7 | 1.43875 | 94.93 |
| 12 | −1.717 | 0.4 | | |
| 13 | ∞ | 0.35 | 1.7725 | 49.6 |
| 14 | 1.009 | 0.66 | 1.6779 | 55.34 |
| 15 | ∞ | 0.1 | | |

TABLE 2-continued

Object-side NA, 0.50; observation region φ 0.2 mm.

| Surface number | r | d | n | ν |
|---|---|---|---|---|
| 16 | ∞ | 0.55 | 1.6779 | 55.34 |
| 17 | −3.375 | 2.38 | | |
| 18 | 2.532 | 1 | 1.7725 | 49.6 |
| 19 | −1.869 | 0.51 | 1.51633 | 64.14 |
| 20 | 1.161 | 1.2 | | |

In the aberration plots in FIGS. 6A, 6B, 6C, 6D, 6E, and 6F, symbol NA indicates the numerical aperture at the image-plane side and symbol y indicates the image height, symbol M indicates the meridional plane and symbol S indicates the sagittal plane, and the magnification chromatic aberration is based on the d-line (587.56 nm).

The wavelength of the s-line is 852.11 nm, the wavelength of the C-line is 656.27 nm, the wavelength of the d-line is 587.56 nm, the wavelength of the e-line is 546.07 nm, the wavelength of the F-line is 486.13 nm, and the wavelength of the g-line is 435.84 nm.

This Example, corrects chromatic aberrations from the visible region to the near-infrared region in the vicinity of 900 nm better than the first Example, and also ensures a larger observation region than the first Example.

As for the lens diameters, those of the parallel flat plate P1 to the biconcave lens L5 are 1 mm and those of the biconvex lens L6 to the biconcave lens L11 are 1.4 mm; that is, only lenses with an extremely small diameter are used in the construction.

Accordingly, the immersion objective optical system 20 of this Example is an optical system that is suitable for examining a site deep inside the body of a small animal, such as a mouse, with minimal invasiveness.

In the immersion objective optical system 20 of this Example, the overall length of the optical system from the tip to the image plane is 11.55 mm, which allows a construction in which, even when connecting a relay lens and CCD after the immersion objective optical system 20 and observing an image at a point slightly away from the living organism, it is difficult for the relay lens or CCD to come into contact with the living organism (its head etc.).

In order to obtain clear fluorescence images and high resolution, a numerical aperture of 0.5 should be ensured at the object side of the immersion objective optical system 20.

Because axial chromatic aberration and magnification chromatic aberration are well-corrected, the objective optical system 20 is suitable for white-light observation and fluorescence observation, and is particularly suitable as the objective optical system in a laser-scanning confocal microscope.

Furthermore, because aberrations are corrected up to the near-infrared region for which dispersion inside the living organism is low, the optical system can more clearly examine a region deep below the tissue surface.

This Example can also be connected to the laser-scanning confocal optical system 2, like the first Example.

THIRD EXAMPLE

Next, an Example of the immersion objective optical system 30 according to the third embodiment will be described below with reference to FIGS. 3, 7A, 7B, 7C, 7D, 7E, and 7F and Table 3.

The symbols in FIGS. 3, 7A, 7B, 7C, 7D, 7E, and 7F and Table 3 are the same as those in the second Example.

This Example, has a longer working distance WD compared to the second Example.

TABLE 3

Object-side NA, 0.50; observation region φ 0.2 mm.

| Surface number | r | d | n | ν |
|---|---|---|---|---|
| object plane | ∞ | 0.2 (working distance) | 1.33304 (water) | 55.79 |
| 1 | ∞ | 0.31 | 1.51633 | 64.14 |
| 2 | ∞ | 0.5 | 1.7725 | 49.6 |
| 3 | −0.804 | 0.1 | | |
| 4 | 2.049 | 0.6 | 1.741 | 52.64 |
| 5 | −1.392 | 0.46 | 1.6134 | 44.27 |
| 6 | 3.677 | 0.15 | | |
| 7 | 1.108 | 0.81 | 1.43875 | 94.93 |
| 8 | −0.703 | 0.35 | 1.6134 | 44.27 |
| 9 | 1.322 | 0.2 | | |
| 10 | 1.961 | 0.7 | 1.43875 | 94.93 |
| 11 | −3.002 | 0.4 | | |
| 12 | 3.002 | 0.35 | 1.7725 | 49.6 |
| 13 | 1.009 | 0.81 | 1.6779 | 55.34 |
| 14 | ∞ | 0.62 | | |
| 15 | 5.02 | 1 | 1.6779 | 55.34 |
| 16 | ∞ | 1.36 | 1.6779 | 55.34 |
| 17 | ∞ | 0.3 | | |
| 18 | 5.168 | 1 | 1.7725 | 49.6 |
| 19 | −1.869 | 0.51 | 1.51633 | 64.14 |
| 20 | 2.132 | 1.18 | | |

Regarding the lens diameters, those from the parallel flat plate P1 to the biconcave lens L5 are 1 mm and those from the biconvex lens L6 to the biconcave lens L11 are 1.4 mm; that is, only lenses with an extremely small diameter are used on the construction.

Thus, the immersion objective optical system 30 of this Example is an optical system that is suitable for examining a site deep inside the body of a small animal, such as a mouse, with minimal invasiveness.

In the immersion objective optical system 30 of this Example, the overall length of the optical system from the tip to the image plane is 11.71 mm, which allows a construction in which, even when connecting a relay lens and CCD after the objective lens and observing an image at a point slightly away from the living organism, it is difficult for the relay lens or CCD to come into contact with the living organism (its head etc.).

In order to obtain clear fluorescence images and high resolution, a numerical aperture of 0.5 should be ensured at the object side of the immersion objective optical system 30.

Because axial chromatic aberration and magnification chromatic aberration are well-corrected, the objective optical system 30 is suitable for white-light observation and fluorescence observation, and is particularly suitable as the objective optical system in a laser-scanning confocal microscope.

Furthermore, because aberrations are corrected up to the near-infrared region for which dispersion inside the living organism is low, the optical system can more clearly examine a region deep below the tissue surface.

The working distance WD is 0.2 mm, so even when the tip of the immersion objective optical system 20 is pressed against biological tissue, it is possible to carry out examination of a site deeper below the surface of the biological tissue being pressed.

This Example can also be connected to the laser-scanning confocal optical system 2, like the first and second Examples.

Table 4 shows data for the conditional expressions (1) to (9) in the first to third Examples.

TABLE 4

|  |  | Example 1 | Example 2 | Example 3 |
|---|---|---|---|---|
| F12 |  | 0.747005 | 0.749227 | 0.759656 |
| F3 |  | −17.9477 | −11.8774 | −7.28923 |
| F14 |  | 0.972077 | 1.003458 | 0.758628 |
| F5 |  | 3.975613 | 4.008181 | 3.024278 |
| β |  | −4.00123 | −3.98537 | −4.01639 |
| ν4 |  | 94.93 | 94.93 | 94.93 |
| ν5 |  | 44.27 | 44.27 | 44.27 |
| n4 |  | 1.43875 | 1.43875 | 1.43875 |
| n5 |  | 1.6134 | 1.6134 | 1.6134 |
| R4O |  | 1.218 | 1.108 | 1.108 |
| R45 |  | −0.674 | −0.703 | −0.703 |
| R3I |  | 3.637 | 2.339 | 3.677 |
| n7 |  | 1.7725 | 1.7725 | 1.7725 |
| n8 |  | 1.6779 | 1.6779 | 1.6779 |
| R5I |  | 2.406 | 1.566 | 1.322 |
| R78 |  | 0.804 | 1.009 | 1.009 |
| Conditional expression | (1) | 0.041621 | 0.06308 | 0.104216 |
|  | (2) | 0.978341 | 0.997746 | 1.007496 |
|  | (3) | 50.66 | 50.66 | 50.66 |
|  | (4) | 0.17465 | 0.17465 | 0.17465 |
|  | (5) | 1.807122 | 1.576102 | 1.576102 |
|  | (6) | 1.6134 | 1.6134 | 1.6134 |
|  | (7) | 44.27 | 44.27 | 44.27 |
|  | (8) | 4.868778 | 3.121884 | 4.840348 |
|  | (9) | 0.238414 | 0.345423 | 0.255471 |

It is also possible to connect an image fiber bundle and CCD to the immersion objective optical systems 1, 20, and 30 of the present invention (all of the first to third embodiments) to carry out bright-field observation.

Possible methods in this case include a method in which an illumination fiber is provided immediately outside the immersion objective optical systems 1, 20, and 30 to illuminate the living organism, and a relay lens and half-mirror are provided behind the objective optical system for making the illumination light incident coaxially with the immersion objective optical systems 1, 20, and 30.

What is claimed is:

1. An immersion objective optical system comprising, in order from an object side: a first group having positive power; a second group having positive power; a third group having negative power; a fourth group having positive power; and a fifth group having positive power, wherein the first group includes a plano-convex lens L1 whose convex surface faces an image-plane side, and a surface at the extreme object side is a substantially flat surface;

the second group includes a lens L2 in which a surface at the extreme object side of the second group is a convex surface facing the object side and a lens L3 in which a surface at the extreme image-plane side of the second group is a concave surface facing the image-plane side;

the third group includes a compound lens in which a biconvex lens L4 and a biconcave lens L5, from the object side, are joined;

the fourth group includes a positive lens L6 whose convex surface faces the object side; and the fifth group includes at least one compound lens.

2. An immersion objective optical system according to claim 1, wherein conditional expression (1) below is satisfied:

$$0.03<|F_{12}/F_3|<0.13 \qquad (1)$$

where $F_3$ is the focal length of the third group; and $F_{12}$ is the combined focal length from the first group to the second group.

3. An immersion objective optical system according to claim 2, wherein conditional expression (2) below is satisfied:

$$0.8<|\beta F_{14}/F_5|<1.2 \qquad (2)$$

where $\beta$ is the magnification of the immersion objective optical system;

$F_{14}$ is the combined focal length from the first group to the fourth group; and $F_5$ is the focal length of the fifth group.

4. An immersion objective optical system according to claim 3, wherein conditional expressions (3), (4), and (5) below are satisfied:

$$\nu_4-\nu_5>40 \qquad (3)$$

$$0.12<n_6-n_4<0.22 \qquad (4)$$

$$1.4<|R_{4O}/R_{45}|<1.9 \qquad (5)$$

where $\nu_4$ and $\nu_5$ are Abbe numbers, at the d-line, of the biconvex lens L4 and the biconcave lens L5, respectively;

$n_4$ and $n_5$ are refractive indexes, at the d-line, of the biconvex lens L4 and the biconcave lens L5, respectively; and $R_{4O}$ and $R_{45}$ are radii of curvature at the object side of the biconvex lens L4 and a joining face of the biconvex lens L4 and the biconcave lens L5, respectively.

5. An immersion objective optical system according to claim 4, wherein conditional expressions (6), (7), and (8) below are satisfied:

$$n_3<1.65 \qquad (6)$$

$$\nu_3<50 \qquad (7)$$

$$3<|R_{3I}/F_{12}|<5 \qquad (8)$$

where $n_3$ is a refractive index, at the d-line, of the lens L3;

$\nu_3$ is an Abbe number, at the d-line, of the lens L3;

$R_{3I}$ is a radius of curvature at the image-plane side of the lens L3; and $F_{12}$ is the combined focal length of the first group and the second group.

6. An immersion objective optical system according to claim 5, wherein the lens at the extreme object side in the fifth group is compound lens in which a negative lens L7 and a positive lens L8 are joined, and conditional expression (9) below is satisfied:

$$0.2<F_{14}^2 \cdot \{(n_5-1)/R_{5I}^2+(n_7-n_8)/R_{78}^2\}<0.4 \qquad (9)$$

where $F_{14}$ is the combined focal length from the first group to the fourth group;

$n_5$, $n_7$, and $n_8$ are refractive indexes, at the d-line, of the lens L5, the lens L7, and the lens L8, respectively; and $R_{5_I}$ and $R_{78}$ are a radius of curvature at the image-plane side of the lens L5 and radius of curvature of a joining face of the lens L7 and the lens L8.

7. An immersion objective optical system according to claim 6, wherein the fifth group includes, from the object side, the compound lens in which the negative lens L7 at the extreme object side and the positive lens L8 are joined; a positive lens L9; and a compound lens in which a positive lens L10 and a negative lens L11 whose concave surface faces the image-plane side are joined.

8. An immersion objective optical system according to claim 1, wherein conditional expression (2) below is satisfied:

$$0.8 < |\beta F_{14}/F_5| < 1.2 \qquad (2)$$

where $\beta$ is a magnification of the immersion objective optical system;

$F_{14}$ is a combined focal length from the first group to the fourth group; and $F_5$ is a focal length of the fifth group.

9. An immersion objective optical system according to claim 8, wherein conditional expressions (3), (4), and (5) below are satisfied:

$$\nu_4 - \nu_5 > 40 \qquad (3)$$

$$0.12 < n_6 - n_4 < 0.22 \qquad (4)$$

$$1.4 < |R_{40}/R_{45}| < 1.9 \qquad (5)$$

where $\nu_4$ and $\nu_5$ are Abbe numbers, at the d-line, of the biconvex lens L4 and the biconcave lens L5, respectively;

$n_4$ and $n_5$ are refractive indexes, at the d-line, of the biconvex lens L4 and the biconcave lens L5, respectively; and $R_{40}$ and $R_{45}$ are radii of curvature at the object side of the biconvex lens L4 and a joining face of the biconvex lens L4 and the biconcave lens L5, respectively.

10. An immersion objective optical system according to claim 9, wherein conditional expressions (6), (7), and (8) below are satisfied:

$$n_3 < 1.65 \qquad (6)$$

$$\nu_3 < 50 \qquad (7)$$

$$3 < |R_{3_I}/F_{12}| < 5 \qquad (8)$$

where $n_3$ is a refractive index, at the d-line, of the lens L3;

$\nu_3$ is an Abbe number, at the d-line, of the lens L3;

$R_{3_I}$ is a radius of curvature at the image-plane side of the lens L3; and $F_{12}$ is a combined focal length of the first group and the second group.

11. An immersion objective optical system according to claim 10, wherein the lens at the extreme object side in the fifth group is a compound lens in which a negative lens L7 and a positive lens L8 are joined, and conditional expression (9) below is satisfied:

$$0.2 < F_{14}^2 \cdot \{(n_5-1)/R_{5_I}^2 + (n_7-n_8)/R_{78}^2\} < 0.4 \qquad (9)$$

where $F_{14}$ is the combined focal length from the first group to the fourth group;

$n_5$, $n_7$, and $n_8$ are refractive indexes, at the d-line, of the lens L5, the lens L7, and the lens L8, respectively; and $R_{5_I}$ and $R_{78}$ are a radius of curvature at the image-plane side of the lens L5 and a radius of curvature of a joining face of the lens L7 and the lens L8.

12. An immersion objective optical system according to claim 11, wherein the fifth group includes, from the extreme object side, the compound lens in which the negative lens L7 and the positive lens L8 are joined; a positive lens L9; and a compound lens in which a positive lens L10 and a negative length L11 whose concave surface faces the image-plane side are joined.

13. An immersion objective optical system according to claim 1, wherein conditional expressions (3), (4), and (5) below are satisfied:

$$\nu_4 - \nu_5 > 40 \qquad (3)$$

$$0.12 < n_6 - n_4 < 0.22 \qquad (4)$$

$$1.4 < |R_{40}/R_{45}| < 1.9 \qquad (5)$$

where $\nu_4$ and $\nu_5$ are Abbe numbers, at the d-line, of the biconvex lens L4 and the biconcave lens L5, respectively;

$n_4$ and $n_5$ are refractive indexes, at the d-line, of the biconvex lens L4 and the biconcave lens L5, respectively; and $R_{40}$ and $R_{45}$ are radii of curvature at the object side of the biconvex lens L4 and the joining surface of the biconvex lens L4 and the biconcave lens L5, respectively.

14. An immersion objective optical system according to claim 13, wherein conditional expressions (6), (7), and (8) below are satisfied:

$$n_3 < 1.65 \qquad (6)$$

$$\nu_3 < 50 \qquad (7)$$

$$3 < |R_{3_I}/F_{12}| < 5 \qquad (8)$$

where $n_3$ is a refractive index, at the d-line, of the lens L3;

$\nu_3$ is an Abbe number, at the d-line, of the lens L3;

$R_{3_I}$ is a radius of curvature at the image-plane side of the lens L3; and $F_{12}$ is a combined focal length of the first group and the second group.

15. An immersion objective optical system according to claim 14, wherein the lens at the extreme object side in the fifth group is a compound lens in which a negative lens L7 and a positive lens L8 are joined, and conditional expression (9) below is satisfied:

$$0.2 < F_{14}^2 \cdot \{(n_5-1)/R_{5_I}^2 + (n_7-n_8)/R_{78}^2\} < 0.4 \qquad (9)$$

where $F_{14}$ is a combined focal length from the first group to the fourth group;

$n_5$, $n_7$, and $n_8$ are refractive indexes, at the d-line, of the lens L5, the lens L7, and the lens L8, respectively; and $R_{5_I}$ and $R_{78}$ are a radius of curvature at the image-plane side of the lens L5 and a radius of curvature of a joining surface of the lens L7 and the lens L8.

16. An immersion objective optical system according to claim 15, wherein the fifth group includes, from the object side, the compound lens in which the lens L7 at the extreme object side and the lens L8 are joined; a positive lens L9; and a compound lens in which a positive lens L10 and a negative lens L11 whose concave surface faces the image-plane side are joined.

17. An immersion objective optical system according to claim 1, wherein conditional expressions (6), (7), and (8) below are satisfied:

$$n_3 < 1.65 \quad (6)$$

$$v_3 < 50 \quad (7)$$

$$3 < |R_{3I}/F_{12}| < 5 \quad (8)$$

where $n_3$ is a refractive index, at the d-line, of the lens L3;

$v_3$ is an Abbe number, at the d-line, of the lens L3;

$R_{3I}$ is a radius of curvature at the image-plane side of the lens L3; and $F_{12}$ is a combine focal length of the first group and the second group.

18. An immersion objective optical system according to claim 17, wherein the lens at the extreme object side in the fifth group is a compound lens in which a negative lens L7 and a positive lens L8 are joined, and conditional expression (9) below is satisfied:

$$0.2 < F_{14}^2 \cdot \{(n_5-1)/R_{5I}^2 + (n_7-n_8)/R_{78}^2\} < 0.4 \quad (9)$$

where $F_{14}$ is a combine focal length from the first group to the fourth group;

$n_5$, $n_7$, and $n_8$ are refractive indexes, at the d-line, of the lens L5, the lens L7, and the lens L8, respectively; and $R_{5I}$ and $R_{78}$ are a radius of curvature at the image-plane side of the lens L5 and a radius of curvature of a joining face of the lens L7 and the lens L8.

19. An immersion objective optical system according to claim 18, wherein the fifth group includes, from the object side, the compound lens in which the negative lens L7, at the extreme object side, and the positive lens L8 are joined; a positive lens L9; and a compound lens in which a positive lens L10 and a negative lens L11 whose concave surface faces the image-plane side are combined.

20. An immersion objective optical system according to claim 19, wherein the lens at the extreme object side in the fifth group is the compound lens in which the negative lens L7 and the positive lens L8 are joined, and conditional expression (9) below is satisfied:

$$0.2 < F_{14}^2 \cdot \{(n_5-1)/R_{5I}^2 + (n_7-n_8)/R_{78}^2\} < 0.4 \quad (9)$$

where $F_{14}$ is the combined focal length from the first group to the fourth group:

$n_5$, $n_7$, and $n_8$ are refractive indexes, at the d-line, of the lens L5, the lens L7, and the lens L8, respectively; and $R_{5I}$ and $R_{78}$ are a radius of curvature at the image-plane side of the lens L5 and a radius of curvature of a joining face of the lens L7 and the lens L8.

* * * * *